_United States Patent Office_

3,524,886
Patented Aug. 18, 1970

3,524,886
NOVEL PHOSPHONIUM HALIDES
John H. Fried, Palo Alto, Calif., assignor to Syntex Corporation, Panama, Panama, a corporation of Panama
No Drawing. Filed Dec. 4, 1967, Ser. No. 687,477
Int. Cl. C07f 9/02
U.S. Cl. 260—606.5                                        7 Claims

ABSTRACT OF THE DISCLOSURE

Phosphonium halides having the formula $$\left[\begin{array}{c} R \\ R-P^+-CH_2-R^6 \\ R \end{array}\right] X^-$$

wherein $R_6$ is a group having one of the formulas

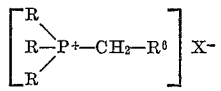, 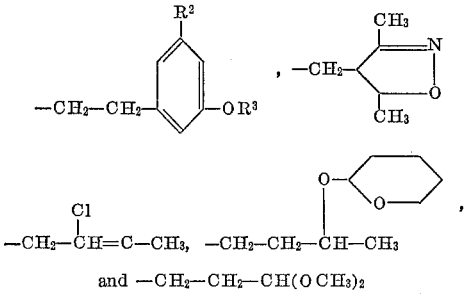

$$-CH_2-\overset{Cl}{\underset{|}{C}H}=C-CH_3, \quad -CH_2-CH_2-\overset{|}{C}H-CH_3$$

and $-CH_2-CH_2-CH(OCH_3)_2$

These compounds are useful as intermediates for the conversion of enol lactones into $\alpha,\beta$-unsaturated carbocyclic ketones useful in the total synthesis of steroids.

---

The present invention relates to the production of unsaturated carbocyclic ketones.

More particularly, this invention relates to a novel process which has general utility for the conversion of enol lactones into $\alpha,\beta$-unsaturated carbocyclic ketones.

The expression "enol lactone," as used herein, refers to an unsaturated lactone having $\alpha,\beta$-ethylenic unsaturation in respect to the heterocyclic oxygen atom. The expression "$\alpha,\beta$-unsaturated carbocyclic ketone," as used herein, refers to a carbocyclic ketone having $\alpha,\beta$-ethylenic unsaturation in respect to the keto group.

Prior to the present invention, enol lactones were converted into $\alpha,\beta$-unsaturated carbocyclic ketones by a two-step process which involved reacting the enol lactone with about one equivalent of a Grignard reagent, for example, methylmagnesium chloride, to open the lactone ring and thereafter the thus-obtained diketonic intermediate product was cyclized by treatment with acid or alkali to obtain the carbocyclic ketone. See, for example, U.S. Pats. 3,057,907 and 3,321,489 and French Pat. 1,359,675. In addition to the disadvantage that the conversion of enol lactones into carbocyclic ketones requires at least two steps, prior methods are often difficult to control, unsuitable for 5-membered ring systems, and of very narrow utility in that the $\alpha,\beta$-unsaturated carbocyclic ketones obtainable are very limited.

A primary object of the present invention, therefore, is to provide a process for the production of $\alpha,\beta$-unsaturated carbocyclic ketones from enol lactones which overcomes the aforementioned disadvantages. Another object of the present invention is to provide a process for the production of $\alpha,\beta$-unsaturated carbocyclic ketones which is economical and simple to operate but yet of great flexibility or adaptability in respect to the type of $\alpha,\beta$-unsaturated carbocyclic ketones that can be produced. Another object of this invention is to provide a single-step process for the production of $\alpha,\beta$-unsaturated carbocyclic ketones. Still another object of the present invention is to provide a process for the production of $\alpha,\beta$-unsaturated carbocyclic ketones which is useful in the total synthesis of steroids and to novel intermediates therefor. Other objects, advantages and meritorious features of the present invention will become apparent as the invention is described in more detail hereinafter.

In accordance with the foregoing objects of the present invention, there has been discovered a very versatile process for the production of $\alpha,\beta$-unsaturated carbocyclic ketones which comprises reacting, under substantially anhydrous conditions in an organic solvent inert to the reaction, an enol lactone with a phosphonium ylid selected from the group consisting of methylenephosphonium ylids and mono-substituted methylenephosphonium ylids.

The process of the present invention is applicable to the conversion of enol lactones into $\alpha,\beta$-unsaturated carbocyclic ketones in general. The enol lactone can be either a monocyclic enol lactone or a polycyclic compound such as bicyclic, tricyclic and tetracyclic enol lactones depending upon the $\alpha,\beta$-unsaturated carbocyclic ketone desired to be obtained. The process of the present invention is particularly suitable for enol lactone starting materials wherein the heterocyclic ring thereof contains at least 5 members and mono-ethylenic unsaturation. The enol lactones which can be converted into $\alpha,\beta$-unsaturated carbocyclic ketones by the process of this invention are too numerous to list. Exemplary of the monocyclic and polycyclic enol lactones which can be used in the process of the present invention are $\alpha$-angelica lactone,
$\Delta^4$-valeryl lactone,
isocoumarin,
3-methyl-6-8-dimethoxyisocoumarin,
3-phenylisocoumarin,
3-benzoyl-7,8-dimethoxyisocoumarin,
3-chloroisocoumarin,
benzal phthalide,
5,6,7-trimethoxyisocoumarin,
$\delta$-lactone of 1$\beta$-hydroxy-2$\beta$-methyl-2$\alpha$-(2'-carboxyethyl)-3-hydroxycyclopent-3-ene,
$\delta$-lactone of 1$\beta$-hydroxy-4-(2'-carboxyethyl)-5-hydroxy-7a$\beta$-methyl-3a$\alpha$,4$\beta$,7,7a-tetrahydro-indane,
4-oxa-17$\beta$-acetoxyandrost-5-en-3-one,
3-ethoxy-17-oxa-D-homoestra-1,3,5(10),
15-tetraen-17-one, 4-oxa-cholest-5-en-3-one,
17,20;20,21-bismethylenedioxy-4-oxa-11$\beta$-hydroxypregn-5-en-3-one,
and 3 - methoxy-16-oxaestra-1,3,5(10),8,14-pentaen-17-one.

The phosphonium ylids which are useful in the production of $\alpha,\beta$-unsaturated carbocyclic ketones in accordance with the process of the present invention are the methylene phosphonium ylids and the mono-substituted methylene phosphonium ylids. Methylene phosphonium ylids and mono-substituted methylene phosphonium ylids useful in the present invention are illustrated by the following formulas A and B, respectively:

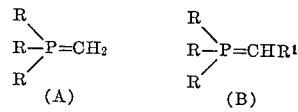

wherein each R is independently selected from the groups consisting of substituted and unsubstituted, saturated and unsaturated, aliphatic and carbocyclic radicals and lower alkoxy radicals and $R^1$ is selected from the group consisting of substituted and unsubstituted, saturated and unsaturated, aliphatic, carbocyclic and carbocyclic-aliphatic radicals.

The phosphonium ylids of Formulas A and B can also be illustrated as follows:

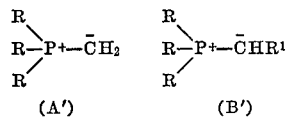

wherein R and R¹ are as defined above.

Phosphonium ylids of Formulas A and B above can be prepared, for eaxmple, by the reaction of a tri-substituted phosphonium halide, e.g., the bromide or chloride, with a reagent, e.g. a base, capable of removing hydrogen halide. Tri-substituted phosphonium halides can be prepared by known methods such as by reacting a tertiary phosphine with an organic halide or a halogen acid. Suitable reagents which can remove hydrogen halide are organo metallic compounds such as alkyl and aryl lithium, alkyl and aryl magnesium halides, alkali metal acetylides, alkali metal amides or alkali metal or alkaline earth alcoholates. The formation of the ylid can be carried out in inert solvents such as ether, tetrahydrofuran or dioxane and preferably in an oxygen-free atmosphere. The method of preparing the phosphonium ylid is not part of the present invention. Suitable procedures for the formation of and examples of methylene phosphonium ylids and mono-substituted methylene phosphonium ylids useful in the present invention are described by A. W. Johnson, "Ylid Chemistry," Academic Press Inc., New York (1966); S. Trippett, Quarterly Reviews, 16, pp. 406–440 (1962); S. Trippett, Advances in Organic Chemistry, vol. I, InterScience, New York, pp. 83–102 (1960); and A. Maercker, "Organic Reactions," vol. 14, John Wiley & Sons, New York, pp. 270–490 (1965), and in U.S. Pats. 2,905,717, 2,917,523, 2,917,524, 2,950,321, 2,957,933 3,078,256, 3,130,219, 3,152,152 and 3,347,932.

Methylene phosphonium ylids and mono-substituted methylene phosphonium ylids are sometimes unstable compounds which react easily with oxygen and decompose on standing for any appreciable period of time. Thus, in the practice of the process of the present invention, it is preferable to use a tri-carbocyclic or tri-(carbocyclic-aliphatic)phosphonium ylid, e.g., a tri-monoaryl such as triphenyl, tritoluyl, and the like, and not to isolate the phosphonium ylid but rather to react it with the enol lactone in situ.

While the methylene phosphonium ylids and mono-substituted methylene phosphonium ylids which can be employed in the process of the present invention are too numerous to list here, they can be exemplified by the following:

methylenetrimethylphosphorane,
methylenetricyclohexylphosphorane,
methylenetriphenylphosphorane,
methylenetri-N-piperidylphosphorane,
methylenetri-N-morpholinophosphorane,
methylenetri-(p-tolyl)phosphorane,
methylenetri-(p-anisyl)phosphorane,
methylenetri-(n-butyl)phosphorane,
methylenediallylmethylphosphorane,
methylenediphenylethylphosphorane,
methylenedimethylphenylphosphorane,
methylenedimethyl p-methoxyphenylphosphorane,
methylenediallylphenylphosphorane,
methylenetribenzylphosphorane,
methylenediphenyltolylphosphorane,
methylmethylenetriphenylphosphorane (ethylidenetriphenylphosphorane),
3,3-dimethoxypropylmethylenetriphenylphosphorane,
ethylmethylenetriphenylphosphorane,
and the like.

In practicing the conversion of an enol lactone into the corresponding α,β-unsaturated carbocyclic ketone in accordance with the process of the present invention, the reaction is carried out using about equal molar amounts of the phosphonium ylid and enol lactone. More than one molar equivalent of the phosphonium ylid can be used but it is generally disadvantageous to do so because the excess reagent may react further with the carbonyl group of the desired carbocyclic ketone. Thus, it is preferred to use about one molar equivalent of the phosphonium ylid or a modest excess such as up to about 1.2 molar equivalents. Any organic solvent can be used for the reaction medium so long as it is inert to the reaction and reagents. Suitable organic solvents are set forth in the references listed hereinabove and include hydrocarbons such as benzene, toluene, and the like, ethers such as tetrahydrofuran, dioxane, monoglyme, diglyme, and the like, dialkylsulfoxides such as dimethylsulfoxide, and the like, and mixtures thereof. When the phosphonium ylid is prepared in situ, the enol lactone can be introduced as a solution using the same solvent as that used for the preparation of the ylid. The reaction generally goes to completion in from about 0.5 hour to about 48 hours depending upon such factors as temperature and the relative reactivity of the ylid and enol lactone. The reaction temperature can vary from about −40° C. to the reflux temperature of the reaction mixture depending upon such factors as the stability of the ylid, the relative reactivity of the ylid and enol lactone being reacted and the time in which it is desired to complete the reaction. In the case of the more stable ylids derived from, for example, triarylphosphonium halides such as methylenetriphenylphosphorane, it is best to employ reaction temperatures of about room temperature to elevated temperatures such as the reflux temperature of the reaction mixture in order to complete the reaction within a shorter period of time. For optimum results, it is important that the reaction be conducted under as near anhydrous conditions as possible and preferably, under an inert oxygen-free atmosphere such as nitrogen, argon and the like. While the concentration of the enol lactone and ylid does not appear to be critical, it is preferred to operate at low concentrations of the order of about two to about twenty-five percent by weight of the reaction medium. The foregoing reaction conditions are largely dependent upon the particular phosphonium ylid and enol lactone employed and are presented as a guide. Provided with the foregoing and the examples hereinafter, the most advantageous or optimum conditions and proportions of the enol lactone and phosphonium ylid for a particular α,β-unsaturated carbocyclic ketone are easily determinable by one of ordinary skill in the art using routine experimentation.

In the case of enol lactone starting materials having other carbonyl groups present, e.g., an isolated keto group, it is preferable to introduce a protecting group prior to the reaction. In general, however, the phosphonium ylid tends to react faster with the enol lactone.

The novel process of the present invention is particularly useful for the production of carbocyclic ketones suitable for the synthesis of steroids.

The following examples are provided to illustrate the present invention.

EXAMPLE 1

To a solution of 5 g. of methylenetriphenylphosphorane in 100 ml. of dry tetrahydrofuran under nitrogen, there is added one molar equivalent of 3-methoxy-16-oxaestra-1,3,5(10),8,14-hexaen-17-one in dry tetrahydrofuran. The mixture is allowed to stand at room temperature for 18 hours and is then filtered. The filtrate is diluted with water and then extracted with ether. The ether extracts are combined and concentrated to furnish a residue which is chromatographed on neutral alumina eluting with benzene to afford 3-methoxy-14β-estra-1,3,5(10),8,15-pentaen-17-one and 3-methoxy-14α-estra-1,3,5(10),8,15-pentaen-17-one which can be further purified by recrystallization from aqueous methanol.

0.5 g. of 3 - methoxy-14α-estra-1,3,5(10),8,15-pentaen-17-one in 25 ml. of ethanol is reduced catalytically with 50 mg. of 5% palladium-on-charcoal until a molar equivalent of hydrogen is taken up. The catalyst is filtered off and the filtrate evaporated to dryness to yield the known 3 - methoxyestra - 1,3,5(10),8 - tetraen - 17 - one which can be converted into estrone methyl ether by procedures outlined in Chemistry & Industry (London), 1022 (1960) or into 19-nor-Δ⁴-steroids using the procedure of, for example, U.S. Pat. 3,318,922.

EXAMPLE 2

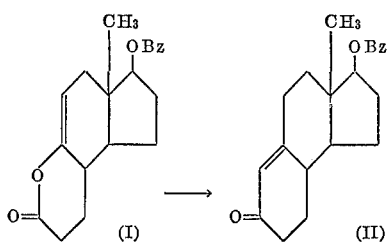

In formulas I and II, Bz represents benzoyl.

To a solution of 3 g. of methylenetriphenylphosphorane in 60 ml. of dry tetrahydrofuran under nitrogen, there is added one molar equivalent of the tricyclic enol lactone of Formula I in dry tetrahydrofuran. The mixture is heated at reflux for about three hours and then allowed to cool to room temperature. The reaction mixture is filtered and the filtrate diluted with water and then extracted with ether. The ether extracts are combined and concentrated under reduced pressure. The residue is chromatographed to afford the compound of Formula II (17β-benzoyloxy-des-A-estr-9-en-5-one) which can be used to prepare therapeutically useful 19-nor or $\Delta^{1,3,5(10)}$-steroids according to the procedure of U.S. Pat. 3,150,152.

The tricyclic enol lactone of Formula I can be obtained according to the procedure of French Pat. 1,359,675 (1964) or Velluz et al., Tetrahedron, Suppl. 8, Part II, pp. 495–505 (1966) and references cited therein.

The process of Example 2 is repeated with exception of using ethylidenetriphenylphosphorane as the Wittig reagent and there is obtained the α,β-unsaturated tricarbocyclic ketone of Formula III.

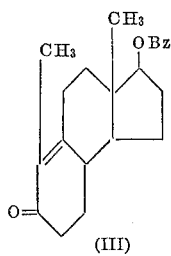

EXAMPLE 3

To a solution of 6 g. of 3-cycloethylenedioxybutylmethylenetriphenylphosphorane in 100 ml. of dry benzene under nitrogen, there is added 1.1 molar equivalents of the tricyclic enol lactone of Formula I in benzene. The mixture is heated at reflux for about two hours and then allowed to cool to about room temperature. The reaction mixture is then poured into water and the resulting mixture extracted with ether. The ether extracts are combined, washed with water, dried over sodium sulfate and concentrated under reduced pressure. The residue is chromatographed to afford the α,β-unsaturated tricarbocyclic ketone of Formula IV.

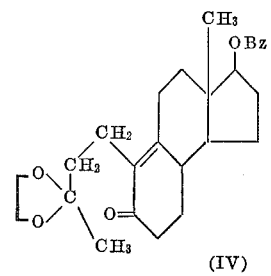

The α,β-unsaturated tricarbocyclic ketone of Formula IV is an excellent intermediate for the preparation of 19-nor steroids using the procedure of, for example, French Pats. 1,369,964 (1964); 1,432,570 (1964); 1,452,898 (1965) or Velluz et al., ibid.

The phosphonium ylid employed in this example can be prepared according to the procedure of Maercker, ibid, or by the following method.

A solution of 20.9 g. of the ethylene ketal of methyl 3-bromopropyl ketone (obtained by treating the ketone with ethylene glycol in benzene in the presence of p-toluenesulfonic acid) in 100 ml. of benzene is treated with 20 g. of triphenylphosphine. This mixture is heated at reflux for two hours and then filtered. The solid material thus collected is washed with benzene, dried in vacuo, and added to 6.5 g. of butyl lithium in 50 ml. of dimethylsulfoxide. This mixture is stirred until a red solution is obtained indicating completion of the ylid formation. The progress of the reaction can be followed by means of the Gilman test which is positive so long as unconsumed butyl lithium is present.

EXAMPLE 4

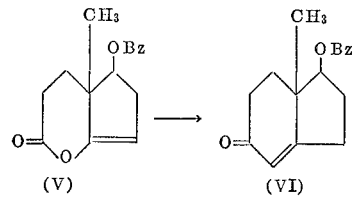

To a suspension of 1.5 g. of methyltriphenylphosphonium bromide in 50 ml. of dry tetrahydrofuran under nitrogen, there is added 1.2 equivalents of n-butyl lithium in hexane with stirring. This mixture is stirred for about 30 minutes and then 1.1 equivalents of the bicyclic enol lactone of Formula V in 50 ml. of dry tetrahydrofuran is added and the resulting mixture heated at reflux for about three hours. After cooling to about room temperature, the reaction mixture is diluted with water and then extracted with ether. The ether extracts are then concentrated under reduced pressure to furnish the 5,6,7,8-tetrahydro-1β-benzoyloxy - 8 - methyl-indane-5-one of Formula VI which can be purified by fractional distillation.

The α,β-unsaturated bicarbocyclic ketone of Formula VI is a valuable intermediate for the synthesis of steriods using the method of, for example, Whitehurst et al., U.S. Pat. 3,317,566.

The bicyclic enol lactone of Formula V can be prepared using the following procedure.

A mixture of 0.3 ml. of 2-methylcyclopentane-1,3-dione, 0.33 ml. of methylacrylate and 0.1 g. of potassium t-butoxide in 200 ml. of t-butanol is allowed to stand at about 20° C. for 72 hours. The reaction mixture is washed with water, dilute sodium hydroxide and then water to neutral, dried and evaporated to give 2-methyl- 2 - (β - carbomethoxyethyl)cyclopentane - 1,3 - dione which was purified by distillation.

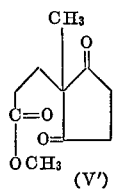
(V')

The above prepared diketoester is then hydrolyzed to the acid by treatment with 1% potassium carbonate in warm methanol:water (1:1) for eight hours. A total of 5 g. of this acid is mixed with 50 ml. of acetic anhydride containing 2 g. of anhydrous sodium acetate and the mixture boiled for five hours. The acetic anhydride is then removed by distillation in vacuo to furnish a residue which is poured into water and extracted with ethyl acetate. The ethyl acetate extracts are combined, washed neutral with water, dried and evaporated. Purification of the resulting residue by vacuum distillation affords 1.2 g. of the enol lactone (VII):

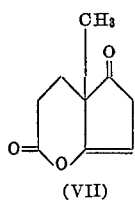
(VII)

A mixture of 5 g. of the diketoester (V'), 100 ml. of tetrahydrofuran and 1.3 molar equivalents of lithium tri-t-butoxyaluminum hydride is heated at reflux until the hydride reagent is consumed. The reaction mixture is cooled, diluted with concentrated aqueous sodium sulfate solution and the resulting clear supernatant decanted and evaporated. The resulting residue is purified by chromatography on alumina to furnish 1.3 g. of the following alcohol

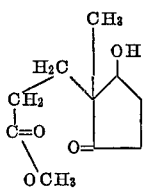

which is converted into the corresponding benzoate by treatment with benzoyl chloride in pyridine. The methyl ester is hydrolyzed to the acid which is then cyclized by the procedure described above to furnish the enol lactone of Formula V.

EXAMPLE 5

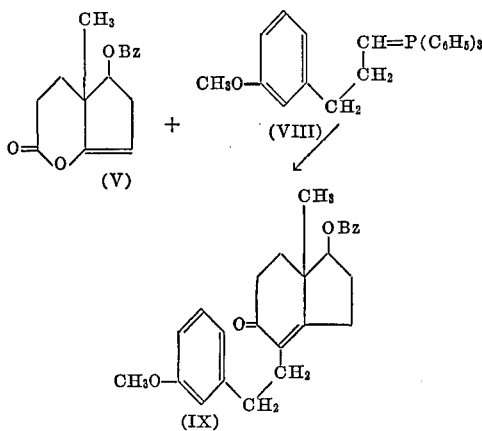

To 3 g. of the triphenylphosphonium ylid of formula VIII in 50 ml. of dry monoglyme under nitrogen, there is added 1.1 molar equivalents of the enol lactone (V) in 75 ml. of dry monoglyme. The reaction mixture is allowed to stand for seven hours at room temperature and then heated at reflux for five hours. After cooling, water is added and the product isolated by extraction with chloroform and purified by chromatography on alumina to afford the indane-5-one of Formula IX, i.e., 5,6,7,8-tetrahydro - 1β - benzoyloxy-4-[(2'-m-methoxyphenyl)ethyl)] - 8β - methylindan-5-one which is converted into 3 - methoxyestra - 1,3,5(10),8,14 - pentaen-17β-ol 17-benzoate by treatment with p-toluenesulfonic acid in boiling benzene or according to the method of U.S. Pat. 3,317,566. The thus-obtained estra-1,3,5(10), 8,14-pentaene can then be converted into therapeutically useful steriods by known procedures, see for example U.S. Pat. 3,337,542.

By repeating the process of this example with the exception that an equivalent amount of the ylid of Formula X below is used.

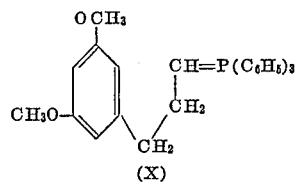
(X)

in place of the ylid of Formula VIII and there is obtained the novel α,β-unsaturated bicarbocyclic ketone of Formula XI below.

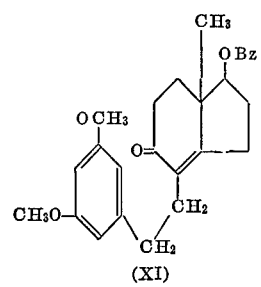
(XI)

The mono-substituted methylene phosphonium ylids (VIII and X) employed in this example can be prepared according to the following procedure.

Meta-methoxycinnamic acid is reduced catalytically using a palladium-on-charcoal catalyst to the propionic acid (XII) which is subjected to lithium aluminum hydride in boiling tetrahydrofuran to afford the corresponding alcohol. The alcohol upon treatment with phosphorous tribromide in warm benzene affords the corresponding bromide (XIII)

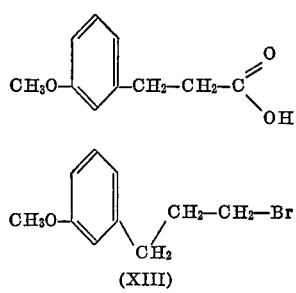
(XIII)

which by heating with triphenylphosphine in toluene furnishes the salt (XIV). Also, by using 3,5-dimethoxycinnamic acid in place of m-methoxycinnamic acid, the corresponding salt (XV) is obtained.

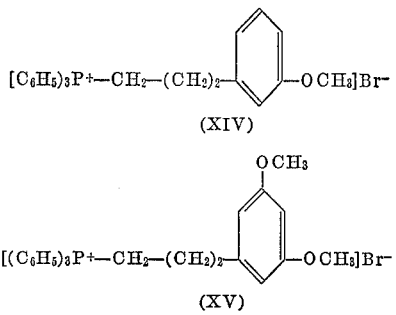

The above salts XIV and XV are then converted into the phosphonium ylids of Formulas VIII and IX, respectively, by treatment with a reagent capable of removing hydrogen halide such as an organo metallic compound, e.g., butyl or phenyl lithium, in an inert organic solvent such as those described hereinabove. The resulting phosphonium ylid can then be isolated by conventional techniques or, preferably, used in situ by adding the enol lactone to the reaction mixture in the same or a different inert solvent as used in the formation of the ylid.

Similarly, by using phosphorus trichloride in the above procedure, the chloride salts corresponding to XIV and XV can be obtained. Also, by using other tri-substituted phosphines in place of triphenylphosphine, e.g., tricyclohexylphosphine, tritolylphosphine, diphenyltolylphosphine, trichlorophenylphosphine, and the like, the corresponding tri-substituted salts and ylids are obtained.

EXAMPLE 6

Methyltriphenylphosphonium bromide (1.94 g.) suspended in 50 ml. of dry tetrahydrofuran is treated with 1.1 equivalents of butyl lithium in hexane under nitrogen. After 15 minutes, 1 g. of benzalphthalide in 10 ml. of tetrahydrofuran is added and the reaction mixture left overnight. The reaction mixture is then diluted with ethyl acetate, washed with water, dried, evaporated and chromatographed on alumina to give 3-benzylind-2-en-1-one. This reaction can be outlined as follows:

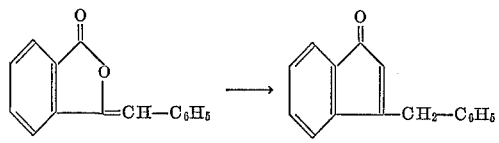

The above process is repeated with the exception of using n-propylmethylenetriphenylphosphorane as the ylid and there is obtained 2-(n-propyl)-3-benzylind-2-en-1-one.

EXAMPLE 7

2.78 g. of methyltriphenylphosphonium bromide is suspended in about 25 ml. of ether. Then 320 mg. of butyl lithium is added and the mixture stirred for about 15 minutes. Then 1 g. of benzalphthalide in about 10 ml. of tetrahydrofuran is added and the mixture stirred overnight at room temperature. The reaction mixture is diluted with water and then extracted with ether. The ether extracts are combined, washed with water, dried and the solvent removed under vacuum. The residue is chromatographed on silica eluting with methylene chloride:hexane (4:1) to afford 3-benzylind-2-en-1-one and a small amount of starting material.

EXAMPLE 8

To a suspension of 600 mg. of methyltriphenylphosphonium bromide in 10 ml. of dry tetrahydrofuran under nitrogen, there is added 97 mg. of butyl lithium. Stirring is continued for about 20 minutes and then 374 mg. of 17β-acetoxy-4-oxa-androst-5-en-3-one in 10 ml. of dry tetrahydrofuran is added. The reaction is allowed to proceed at room temperature overnight. The reaction mixture is then diluted with water followed by extraction with ether. The ether extracts are combined, dried over magnesium sulfate and evaporated to a residue which is purified by chromatography to yield testosterone acetate (17β-acetoxyandrost-4-en-3-one).

By using methylmethylenetriphenylphosphorane as the ylid reagent in the process of this example, the corresponding methyl substituted tetracarbocyclic compound is obtained, i.e., 4-methyl-17β-acetoxyandrost-4-en-3-one.

By using other steroidal enol lactones in the above process in place of 17β-acetoxy-4-oxa-androst-5-en-3-one as the starting material, e.g. 4-oxa-cholest-5-en-3-one, 3-ethoxy - 17-oxa-D-homoestra-1,3,5(10),15-tetraen-17-one, and the like, the corresponding α,β-unsaturated tetracarbocyclic ketone is obtained, e.g. cholest-4-en-3-one and 3-ethoxy-D-homoestra-1,3,5(10),14-pentaen-17-one.

EXAMPLE 9

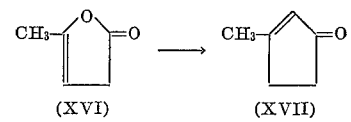

To 4 g. of methylenetricyclohexylphosphorane in 50 ml. of dry tetrahydrofuran under nitrogen, there is added 1.1 molar equivalents of α-angelica lactone in 50 ml. of dry tetrahydrofuran. The reaction mixture is allowed to stand at about 20° C. for eight hours and then diluted with water followed by extraction with ether. The ether extracts are combined, washed, dried over magnesium sulfate and evaporated under reduced pressure to afford 3-methylcyclopent-2-en-1-one which can be further purified, if desired, by vacuum distillation.

By using a mono-substituted methylene phosphonium ylid, e.g., methylmethylenetriphenylphosphorane (ethylidenetriphenylphosphorane) in place of the methylene phosphonium ylid employed above, the corresponding 2-substituted α,β-unsaturated cyclopentanones can be obtained, e.g., 2,3-dimethylcyclopent-2-en-1-one.

EXAMPLE 10

To a suspension of 4 g. of 3,3-dimethoxypropylmethylenephosphonium bromide in 50 ml. of dry monoglyme under nitrogen, there is added 1.2 equivalents of phenyl lithium in hexane with stirring. This mixture is stirred for about 30 minutes and then 1.1 equivalents of the bicyclic enol lactone (V) in 50 ml. of dry monoglyme is added. The reaction mixture is heated at reflux for about three hours and then is allowed to cool to room temperature. The reaction mixture is then diluted with water and extracted with ether. The ether extracts are combined, washed, dried over magnesium sulfate and evaporated under reduced pressure. The residue is chromatographed on silica to afford the α,β-unsaturated bicarbocyclic ketone (XVIII).

A mixture of 1 g. of the bicarbocyclic ketone (XVIII), 25 ml. of methanol and 1 ml. of concentrated HCl is boiled 15 minutes. The reaction mixture is allowed to cool, poured into water and the resulting mixture separated. The organic phase is evaporated to dryness to furnish the aldehyde (XIX) which is taken up in 20 ml. of acetone, cooled to 0° C. and a slight molar excess of Jones reagent (prepared by mixing 26 g. of chromium trioxide with 23 ml. of concentrated sulfuric acid and diluting with water to 100 ml.). Upon completion of the oxidation as followed by thin layer chromatography, the reaction mixture is diluted with water and then extracted with ethyl acetate. The ethyl acetate extracts are combined, washed with water, dried and evaporated under reduced pressure to afford the acid (XX) which is a valuable intermediate for the synthesis of known 19-nor-Δ⁴ and Δ⁵⁽¹⁰⁾-steroids useful as therapeutic agents using the procedure of, for example, Belgium Pat. 629,251 (1963); French Pat. 1,465,400 (1965) or Velluz et al., ibid.

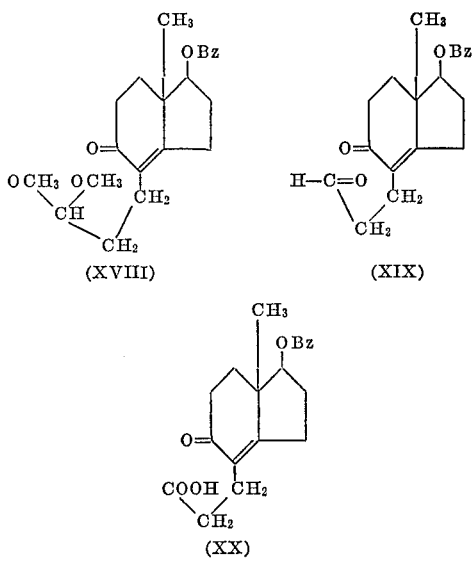

The 3,3 - dimethoxypropylmethylenetriphenylphosphonium bromide employed in this example can be obtained according to the following procedure.

To 0.5 mole of diethylmalonate in 0.5 liter of dry benzene is added 0.5 mole of sodium hydride cautiously and the mixture stirred until hydrogen evolution ceases. Then 0.5 mole of bromoacetaldehydedimethylacetal [$(CH_3O)_2$—CH—$CH_2$—Br] in 100 ml. of benzene is added and the mixture stirred overnight followed by refluxing for two hours. The reaction mixture is cooled, washed with water and purified by vacuum distillation to give β,β-dimethoxyethylmalonic acid diethyl ester. A mixture of 5 g. of this ester in 100 ml. of ethanol containing 5 g. of sodium hydroxide is heated under reflux until evolution of carbon dioxide ceases. The reaction mixture is then saturated with carbon dioxide and evaported to dryness under vacuum. The residue is suspended in 50 ml. of dry dimethylformamide to which is added a large excess of methyl iodide. The reaction mixture is stirred at room temperature for about 24 hours and then poured into water. The resulting mixture is extracted with ether and the ether extracts combined, washed with water and evaporated to give γ-dimethoxybutyric acid methyl ester which is purified by distillation. A mixture of 4 g. of this methyl ester, 50 ml. of dry tetrahydrofuran and 1.1 equivalents of lithium aluminum hydride is refluxed overnight. The reaction mixture is allowed to cool and then diluted with water. This mixture is extracted with ether and the ether extracts are combined, washed, dried and evaporated to dryness to afford 4,4-dimethoxybutanol [$(CH_3O)_2$—CH—$CH_2$—$CH_2$—$CH_2$—OH].

A solution of 0.1 mole of 4,4-dimethoxybutanol in 50 ml. of dimethylformamide containing 0.1 mole of triphenylphosphine is allowed to react for 18 hours with 0.1 mole of carbon tetrabromide. The mixture is diluted with water and extracted with ether. The ether extracts are combined, washed with water, dried and evaporated to a crude product which is purified by distillation to yield 4,4-dimethoxybutylbromide. This bromide on treatment with triphenylphosphine in toluene furnishes 3,3 - dimethoxypropylmethylenetriphenylphosphonium bromide.

By repeating this procedure using carbon tetrachloride in place of carbon tetrabromide, there is obtained 3,3-dimethoxypropylmethylenetriphenylphosphonium chloride.

Also, by using other tri-substituted phosphines in place of triphenylphosphine in the above procedure, e.g. tri-(p-tolyl)phosphine, trichlorophenylphosphine, diphenyltolylphosphine, the corresponding tri-substituted phosphonium bromide and chloride are obtained.

EXAMPLE 11

The process of Example 10 is repeated using the phosphonium ylid (XXI) as the ylid reagent and the corresponding carbocyclic ketone (XXII) is obtained which can be converted into valuable 6-methyl steroids.

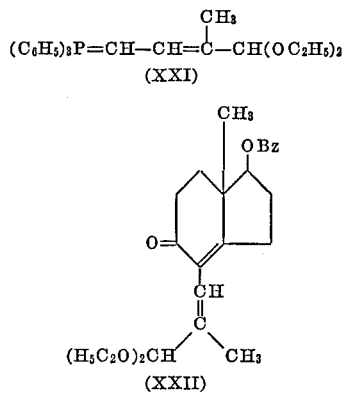

Conversion of the carbocyclic ketone (XXII) into 6-methyl steroids can be accomplished by, for example, catalytic reduction using 5% palladium-on-charcoal in ethanol to the intermediate (XXIII) which is converted into the free acid (XXIV) using the procedure described in Example 10. The free acid can then be cyclized to the tricyclic enol lactone (XXV) using the method of Velluz et al., ibid. The enol lactone (XXV) can then be treated as described in Examples 2 or 3 to obtain the corresponding tricarbocyclic ketone which can be converted into 6-methyl steroids using the procedures referenced therein.

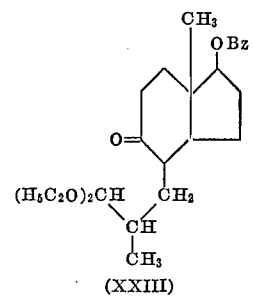

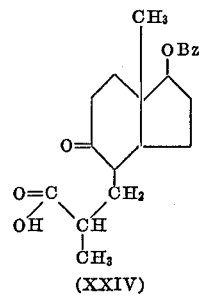

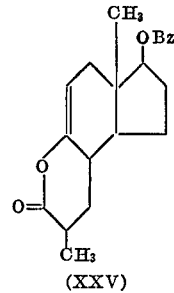

EXAMPLE 12

To a suspension of 4 g. of (3-chlorobutyl-2-enyl) methylenetriphenylphosphonium bromide (XXVI) in 50 ml. of dry monoglyme, there is added 1.1 equivalents of butyl lithium in hexane with stirring under nitrogen. This mixture is stirred for about 25 minutes and then 1.1 equivalents of the tricyclic enol lactone (I) in 60 ml. of dry monoglyme is added. The reaction mixture is allowed to stand at room temperature for about two hours and is then heated at reflux for about three hours. After cooling, the reaction mixture is diluted with water and then extracted with ether. The ether extracts are combined, washed, dried over magnesium sulfate and evaporated under reduced pressure to afford the $\alpha,\beta$-unsaturated tricarbocyclic ketone (XXVII) which can be purified further by chromatography on alumina.

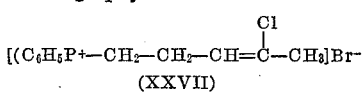

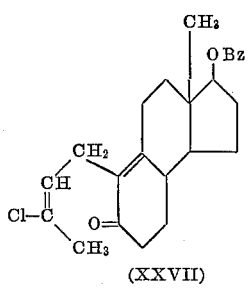

(XXVII)

The tricarboxylic ketone (XXVII) is a useful intermediate for the synthesis of valuable 19-nor steroids using known procedures such as U.S. Pats. 3,050,550, 3,019,252 and 3,150,152.

The phosphonium bromide (XXVI) can be prepared according to the following procedure.

A mixture of 10 g. of 1-bromopentan-4-one, 100 ml. of carbon tetrachloride and 5 g. of phosphorus pentachloride is refluxed for 10 hours. The reaction mixture is then cooled, washed with dilute sodium carbonate and water, dried over magnesium sulfate and evaporated to give 1 - bromo - 4 - chloropent-3-ene which is purified by distillation and converted into the phosphonium bromide (XXVI) by treatment with triphenylphosphine in benzene.

EXAMPLE 13

The process of Example 12 is repeated with the exception that 3 - (tetrahydropyran - 2' - yloxy)butylmethylenetriphenylphosphorane is used as the ylid and there is obtained the tricarbocyclic ketone (XXVIII) which can be converted into 19-nor steroids using procedures described hereinabove, see for example, Example 3.

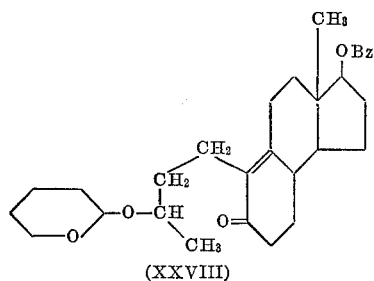

(XXVIII)

A mixture of 10 g. of 1 - chloropentan-4-one, 100 ml. of ether and 1 g. of lithium aluminum hydride is allowed to stand at 20° C. for 20 hours. The reaction mixture is diluted with water and separated. The organic phase is washed with water, dried and evaporated to give 1-chloropentan-4-ol which is purified by distillation. Two ml. of dihydropyran is added to a solution of 1 g. of 1-chloropentan-4-ol in 15 ml of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated to yield 4 - (tetrahydropyran - 2' - yloxy)-1-chloropentane which is treated with triphenylphosphine in benzene to furnish 3 - (tetrahydropyran - 2' - yloxy)butylmethylenetriphenylphosphonium chloride. This phosphonium chloride is then treated with butyl lithium in dry monoglyme to afford the ylid.

EXAMPLE 14

The process of Example 12 is repeated with the exception that the ylid employed is an ylid of Formula XXXI and there is obtained the tricarbocyclic ketone (XXXII) which is useful in the synthesis of valuable 2-methyl-19-nor steroids using the procedure of, for example, Velluz et al., ibid.

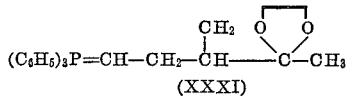

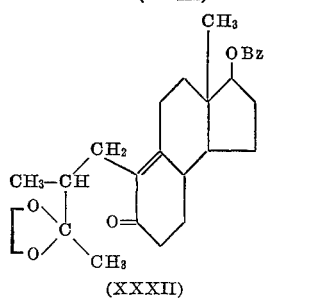

(XXXII)

The phosphonium ylid (XXXI) can be prepared as follows.

A mixture of 0.5 mole of 1-acetoxypentan-4-one and 0.5 mole of pyridine in benzene is refluxed using a water separator until no more water distills from the reaction mixture. The reaction mixture is then cooled, washed and dried to afford the 1-acetoxypent-3-ene (XXXIII). A mixture of 5 g. of XXXIII in 100 ml. of dioxane is treated with an excess of methyl iodide at 20° C. for 18 hours and then heated at 70° C. for six hours. The reaction mixture is concentrated to a small volume, diluted with water and 1-acetoxy-3-methylpentan-4-one isolated by extraction with ethyl acetate. A mixture of 0.5 g. of this ketone, 100 mg. of p-toluenesulfonic acid, 3 ml. of ethylene-glycol and 100 ml. of benzene is refluxed using a water separator for 24 hours. The reaction mixture is cooled and then 100 ml. of ethanol and 2 g. of potassium hydroxide are added. This mixture is refluxed for six hours, cooled, diluted with water and the corresponding ethylene ketal is isolated by extraction with ethyl acetate. A solution of 0.1 mole of the ketal in 50 ml. of dimethylformamide containing 0.1 mole of triphenylphosphine is reacted with 0.1 mole of carbon tetrabromide at room temperature for 18 hours. The mixture is diluted with water and extracted with ether. The ether extracts are combined, washed with water, dried and evaporated. The residue is chromatographed on 400 g. of alumina eluting with hexane-benzene and benzene to give the ethylene ketal of 1-bromo-3-methylpentan-4-one which is treated with triphenylphosphine in toluene to afford 3,3-ethylenedioxy-2 - methylbutylmethylenetriphenylphosphonium bromide which upon treatment with butyl lithium in monoglyme furnishes the ylid (XXXI).

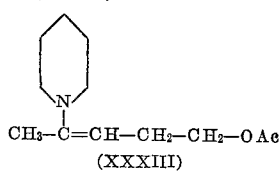

(XXXIII)

EXAMPLE 15

Ten grams of m-methoxycinnamic acid in 100 ml. of ethanol is treated with 0.5 g. of pre-hydrogenated 10% palladium-on-charcoal until the uptake of hydrogen ceases.

The catalyst is removed by filtration and the filtrate evaporated to yield 3-(m-methoxyphenyl)propionic acid.

A solution of 5 g. of the foregoing propionic acid in 100 ml. of tetrahydrofuran is added cautiously to a boiling solution of 250 ml. of tetrahydrofuran containing 3 g. of lithium aluminum hydride. The reaction mixture is refluxed overnight with stirring and then cooled and the excess of hydride decomposed by the cautious addition of ethyl acetate and then saturated sodium sulfate. The resulting clear solution is decanted and dried over sodium sulfate. The solvent remaining is removed by distillation to give 3-(m-methoxyphenyl)propanol which is purified by distillation in vacuo. One gram of this propyl alcohol in 50 ml. of benzene is boiled with a slight excess of phosphorus pentabromide until thin layer chromatography no longer indicates the presence of starting alcohol. The reaction mixture is cooled, washed with water and dilute sodium carbonate solution, dried over sodium sulfate and concentrated to dryness. The resulting crude 3-(m-methoxyphenyl)propionyl bromide is purified by distillation and then converted into the phosphonium salt by reaction with triphenylphosphine in toluene.

EXAMPLE 16

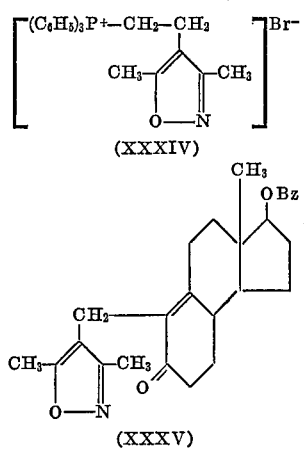

The mono-substituted methylenetriphenylphosphonium bromide (XXXIV) (4 g.) in 75 ml. of ether is treated with 1 equivalent of butyl lithium in ether under nitrogen at −20° C. After about 15 minutes, the tricyclic enol lactone (I) (1.1 equivalents) in ether is added and the reaction mixture allowed to warm to room temperature. The reaction mixture is then diluted with water and then extracted with ether. The ether extracts are combined, washed with water, dried and evaporated under reduced pressure. The residue is purified by chromatography on alumina to give the tricarbocyclic ketone (XXXV).

The phosphonium bromide (XXXIV) can be obtained to the following outlined procedure.

Ten grams of the isoxazole (1) is heated at reflux with 200 ml. of 1% sodium hydroxide in methanol for five hours. The reaction mixture is then acidified at pH 3 with HCl and the acidified mixture is then concentrated to a small volume under reduced pressure. Water is added and the acid isolated by extraction with ethyl acetate. The crude acid (9 g.) is taken up in methanol and treated with 1 equivalent of sodium methoxide. The alcohol is evaporated and the residue dried under reduced pressure. The residue is then suspended in dry benzene and treated at 0° C. with an excess of oxalyl chloride. After the evolution of gas ceases, the reaction mixture is allowed to warm to room temperature and the excess of oxalyl chloride removed by evaporation of the solvent medium to dryness. The resulting acid chloride (2) is taken up in benzene and treated with an excess of ethereal diazomethane. After the formation of the diazoketone is complete, the ether is removed and the resulting diazoketone heated under reflux in octane-2-ol until nitrogen evolution ceases. The crude product is purified by distillation and reduced with an excess of lithium aluminum hydride in 200 ml. of tetrahydrofuran under reflux. The reaction mixture is decomposed by cautious addition of ethyl acetate and the inorganic salts precipitated by the addition of concentrated sodium sulfate solution. The solution is then filtered and evaporated to yield the alcohol (5) which is purified by distillation. The alcohol (5) is then treated with phosphorus tribromide in benzene to give the bromide (6) which is converted into the phosphonium salt (XXXIV) by treatment with 1 equivalent of triphenylphosphine in benzene.

The tricarbocyclic ketone (XXXV) is an excellent intermediate for the preparation valuable 19-nor or androstene steroids by methods disclosed in the Journal of American Chemical Society, 82, #21 5464 (1967).

EXAMPLE 17

To a suspension of 3 g. of methyltriphenylphosphonium bromide in 75 ml. of dry tetrahydrofuran under nitrogen, there is added 1.1 equivalents of n-butyl lithium in hexane with stirring. After stirring for about 30 minutes, 1 molar equivalent of 3-methoxy-15-methyl-16-oxaestra-1,3,5(10), 6,8,14-hexaen-17-one in dry tetrahydrofuran is added and the mixture allowed to stand at room temperature for 18 hours. The mixture is filtered and the filtrate diluted with water and extracted with ether. The ether extracts are combined, washed, dried and evoporated to a residue which is chromatographed on alumina to yield 3-methoxy-15 - methyl - 14α-estra-1,3,5(10),6,8,15-hexaen-17-one and 3 - methoxy - 15-methyl-14β-estra-1,3,5(10),6,8,15-hexaen-17-one which can be purified further by recrystallization from aqueous methanol.

By repeating the above process using other 16-oxa steroids of the Formula XXXVI as the tetracyclic enol lactone starting material, the corresponding steroidal

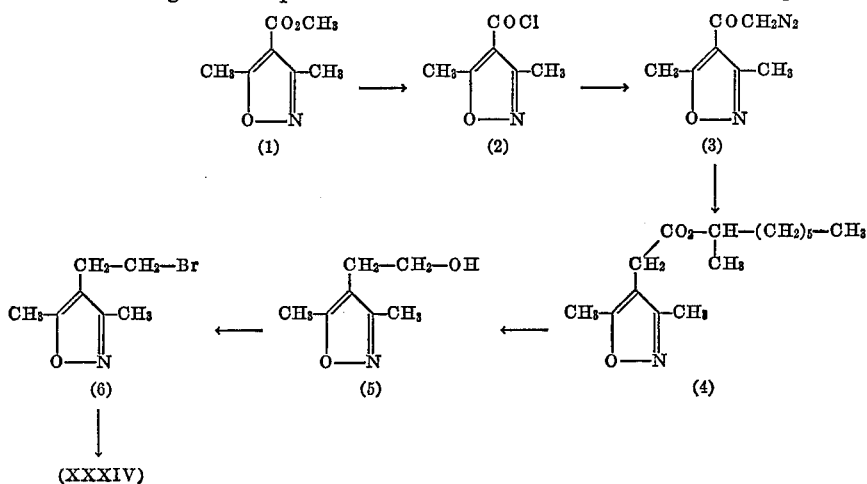

ketone (tetracarbocyclic ketone) of the Formula XXXVII is obtained.

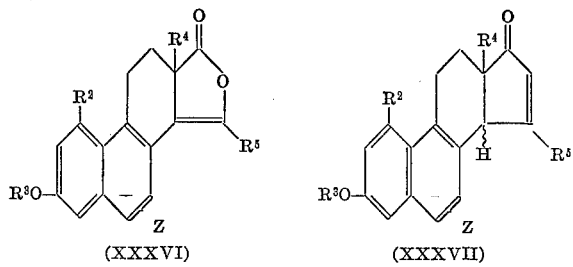

(XXXVI)  (XXXVII)

In the above formulas, $R^2$ is hydrogen or lower alkoxy of 1 to 6 carbon atoms, $R^3$ is lower alkyl of 1 to 6 carbon atoms, $R^4$ is methyl, ethyl or propyl, $R^5$ is hydrogen or methyl and Z is a carbon to carbon single or double bond between C–6 and C–7.

The tetracarbocyclic ketones (XXXVII) can be converted into therapeutically useful steroids using the procedures described and referenced in Example 1. The 15-methyl substituted steroids can be used in the same manner as the corresponding 15-unsubstituted steroids.

The tetracyclic enol lactones of Formula XXXVI can be prepared according to the method of copending U.S. application Ser. No. 638,648, filed May 15, 1967, and U.S. Pat. 3,309,383.

EXAMPLE 18

The process of Example 2 is repeated using the tricyclic enol lactone (XXXVIII) ($R^4$ is ethyl, Ac is trifluoroacetyl) in place of the enol lactone (I) and the corresponding tricarbocyclic ketone is obtained (XXXIX) ($R^4$ is ethyl, Ac is trifluoroacetyl).

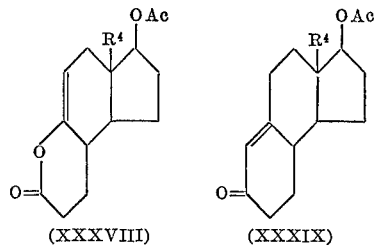

(XXXVIII)  (XXXIX)

In the above formulas, $R^4$ is methyl, ethyl or propyl and Ac is hydrogen or a carboxylic acyl group such as acetyl, trifluoroacetyl, benzoyl, propionyl, and the like containing up to about 12 carbon atoms.

The enol lactones (XXXVIII) can also be used as the starting material in the process of Example 3 to obtain the correponding substituted tetracarbocyclic ketones. The enol lactones (XXXVIII) can be prepared using the procedure described by Velluz et al., ibid.

EXAMPLE 19

The process of Example 5 is repeated with the exception of using the enol lactone (XL) ($R^4$ is ethyl, Ac is benzoyl) in place of the enol lactone (V) and the corresponding substituted bicarbocyclic ketone (XLI) ($R^2$ is hydrogen, $R^3$ is methyl, $R^4$ is ethyl and Ac is benzoyl).

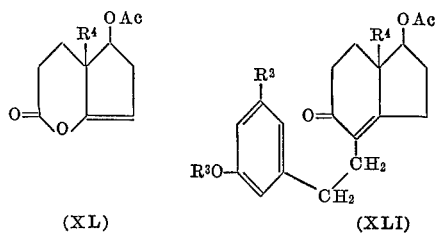

(XL)  (XLI)

In the above formulas $R^2$, $R^3$, $R^4$ and Ac are as defined hereinabove.

Other bicarbocyclic ketones of Formula XLI can be obtained using the other enol lactones (XL) as the starting material and the processes set out in Example 5. The enol lactones (XL) wherein $R^4$ is ethyl or propyl can be prepared using the procedure described in Example 4 by using 2-ethylcyclopentan-1,3-dione and 2-propylcyclopentan-1,3-dione, respectively, in place of 2-methylcyclopentan-1,3-dione.

EXAMPLE 20

By subjecting the tricarbocyclic ketone (XXVIII) to acid hydrolysis conventionally used to remove a tetrahydropyranyl protecting group, e.g., dilute hydrochloric acid at room temperature, the corresponding free alcohol (XXVIII′) is obtained which can be subjected to oxidation using, for example, chromium trioxide in pyridine at room temperature to give the corresponding carbonyl (XXVIII″). The tricarbocyclic (XXVIII″) can be converted into valuable estrogens using known procedures, see U.S. Pat. 3,150,152.

EXAMPLE 21

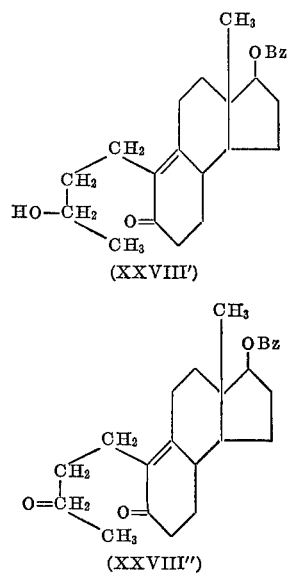

(XXVIII′)

(XXVIII″)

The process of Example 4 for the preparation of the bicyclic enol lactone (V) is repeated with the exception that trifluoroacetyl chloride, acetyl chloride, and trimethylacetyl chloride is used in place of benzoyl chloride and there is obtained the corresponding carboxylic esters of V, that is, the trifluoroacetate, acetate and trimethylacetate.

What is claimed is:
1. A phosphonium halide of the following formula:

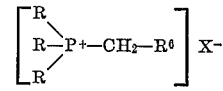

wherein X is a chlorine, bromine or iodine atom, R is independently selected from the group consisting of monoaryl, alkyl having from one to four carbons, allyl, cyclohexyl, benzyl, N-piperidyl, and N-morpholino, $R^6$ is selected from the groups

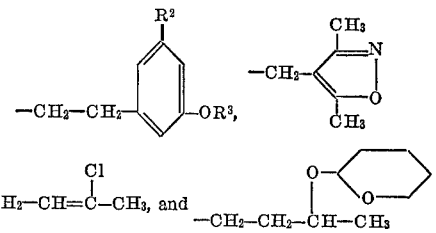

in which $R^2$ is hydrogen or lower alkoxy and $R^3$ is lower alkyl.

2. A phosphonium halide according to claim 1 wherein R is monoaryl.

3. A phosphonium halide according to claim 1 wherein R is a monoaryl and $R^6$ is the group

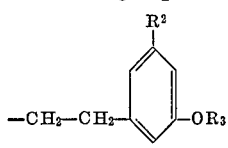

wherein $R^2$ and $R^3$ are as defined therein.

4. A phosphonium halide according to claim 3 wherein R is phenyl, $R^2$ is hydrogen and $R^3$ is methyl.

5. A phosphonium halide according to claim 3 wherein R is phenyl, $R^2$ is methoxy and $R^3$ is methyl.

6. A phosphonium halide of the following formula:

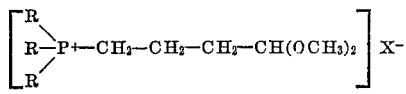

wherein X is a chlorine, bromine or iodine atom and R is independently selected from the group consisting of monoaryl, alkyl having from one to four carbons, allyl, cyclohexyl, benzyl, N-piperidyl, and N-morpholino.

7. A phosphonium halide according to claim 6 wherein R is monoaryl and X is a chlorine or bromine atom.

References Cited

UNITED STATES PATENTS

| | | | |
|---|---|---|---|
| 3,143,544 | 8/1964 | Van Dormael et al. | 260—307 X |
| 3,150,149 | 9/1964 | Uhlenbroek et al. | 260—307 X |
| 3,192,205 | 6/1965 | Depoorter et al. | 260—307 X |
| 3,347,932 | 10/1967 | Chechak | 260—606.5 |
| 3,354,155 | 11/1967 | Tretter | 260—606.5 X |
| 3,364,245 | 1/1968 | Grayson et al. | 260—606.5 X |
| 3,373,207 | 3/1968 | Nuerrenbach et al. | 260—606.5 |

TOBIAS E. LEVOW, Primary Examiner

W. F. W. BELLAMY, Assistant Examiner

U.S. Cl. X.R.

260—307, 345.9, 293, 247